United States Patent

Higuchi et al.

[11] Patent Number: 5,229,679
[45] Date of Patent: Jul. 20, 1993

[54] MICRODRIVE APPARATUS

[75] Inventors: Toshiro Higuchi, Tokyo; Ken-ichi Kudoh; Atsushi Mimatsu, both of Ibaraki, all of Japan

[73] Assignee: Prima Meat Packers, Ltd., Japan

[21] Appl. No.: 697,499

[22] Filed: May 3, 1991

Related U.S. Application Data

[63] Continuation of Ser. No. 410,755, Sep. 22, 1989, abandoned.

[30] Foreign Application Priority Data

Dec. 28, 1988 [JP] Japan ................. 63-333739
Apr. 6, 1989 [JP] Japan ................. 1-87287

[51] Int. Cl.⁵ ........................... H01L 41/08
[52] U.S. Cl. ............................... 310/328
[58] Field of Search ..................... 310/323, 328

[56] References Cited

U.S. PATENT DOCUMENTS

| | | | |
|---|---|---|---|
| 3,808,488 | 4/1974 | Massa | 310/328 |
| 3,813,022 | 5/1974 | Radobenko | 228/3 |
| 3,835,338 | 9/1974 | Martin | 310/328 X |
| 3,957,162 | 5/1976 | Sodergvist | 310/328 X |
| 4,484,854 | 11/1984 | Chitayat | 414/730 |
| 4,709,183 | 11/1987 | Lange | 310/328 |
| 4,894,579 | 1/1990 | Higuchi et al. | 310/328 |

FOREIGN PATENT DOCUMENTS

| | | | |
|---|---|---|---|
| 0292989 | 5/1988 | European Pat. Off. | |
| 0148389 | 8/1985 | Japan | 310/328 |
| 0160778 | 7/1987 | Japan | 310/328 |
| 0217878 | 9/1987 | Japan | 310/328 |

Primary Examiner—Mark O. Budd
Attorney, Agent, or Firm—Lorusso & Loud

[57] ABSTRACT

A microdrive apparatus of a micromanipulator according to the present invention is such that a piezoelectric-/electrostrictive element having an inertial member mounted at its tip is attached to a moving member supported on a frictional surface of a support member, and a miniature instrument for manipulation is attached to the moving member. By applying an electric field to the piezoelectric/electrostrictive element, the miniature instrument for manipulation is controlled for fine movement by utilizing this kinetic energy, the inertial effect of the inertial member, and the reaction force acting upon the moving member. In addition, the miniature instrument for manipulation can be controlled to assume a predetermined position and predetermined attitude by a micropositioning device having an articulated portion in which an inertial member is attached to an arm via a piezoelectric/electrostrictive element.

8 Claims, 7 Drawing Sheets

(PRIOR ART)

Fig. 3(a)
Fig. 3(b)
Fig. 3(c)
Fig. 3(d)
Fig. 3(e)

(PRIOR ART)

MICRODRIVE APPARATUS

This application is a continuation of application Ser. No. 07/410,755, filed Sep. 22, 1989, now abandoned.

BACKGROUND OF THE INVENTION

This invention relates to a drive apparatus capable of applying a driving force on the micro- or nanometer order to a driven body. More particularly, the invention relates to a microdrive apparatus applicable to a working drive mechanism for a micromanipulator used in biotechnology, a positioning mechanism for effecting positioning between a manipulated object and a miniature instrument for manipulation, and a robot or articulated mechanism which undergoes fine movement.

An apparatus for effecting fine movement by means of impact force using a piezoelectric element (or an electrostrictive element) has previously been proposed by the inventor of the present application and has been disclosed as Japanese Patent Application Laid-Open (KOKAI) No. 63-299785.

The general features of the construction and operation of this conventional apparatus for effecting fine movement will now be described with reference to FIGS. 1 through 4.

Figure 1:
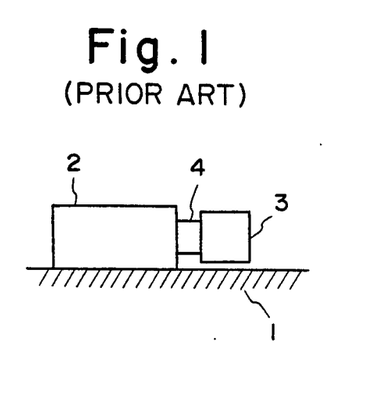
FIG. 1 is a side view illustrating the conventional apparatus for effecting fine movement.
Figure 2:
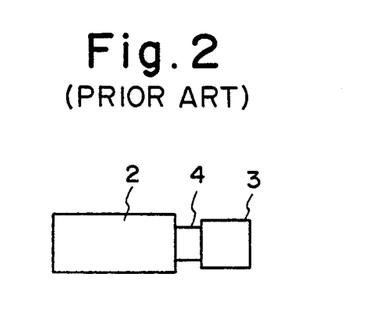
FIG. 2 is a plan view illustrating the conventional apparatus for effecting fine movement.

The apparatus for effecting fine movement includes a moving member 2, an inertial member 3 and a piezoelectric/electrostrictive element 4 coupling the members 2 and 3 together, and is so adapted that the moving member 2 is placed on a base 1 and held there by frictional force.

By applying a voltage to the piezoelectric/electrostrictive element 4, the inertial member 3 is accelerated and the reaction thereof is utilized to cause movement of the moving member 2. This makes possible fine movement on the order of from 10 nm to 10 µm through a simple mechanism.

Figure 3A:
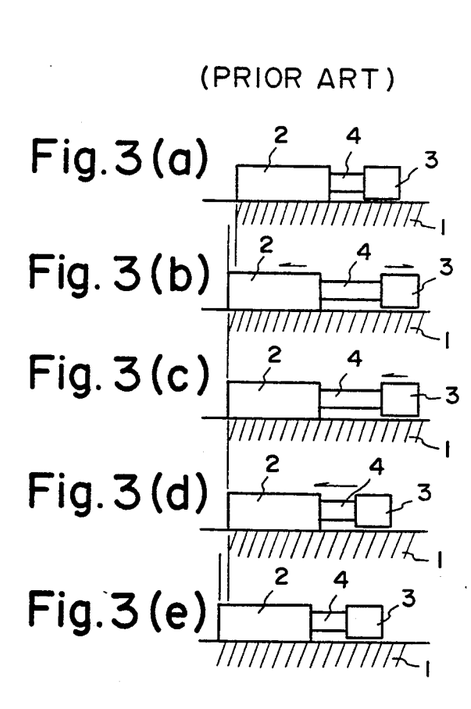
Figure 4A:
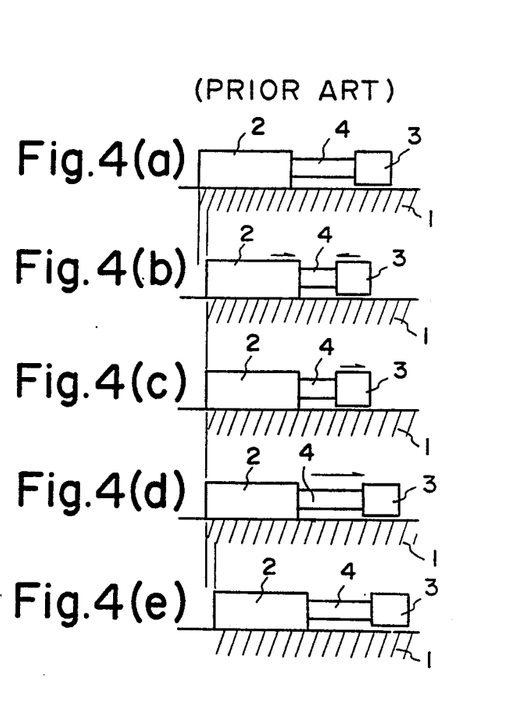

The principle of movement is as follows: In a case where the moving member 2 is moved in the leftward (+) direction, as illustrated in FIG. 3, first the piezoelectric/electrostrictive element 4, which is in the constricted state shown in FIG. 3(a), is suddenly elongated, as illustrated in FIG. 3(b), the moving member 2 and inertial member 3 move away from each other. Next, when the piezoelectric/electrostrictive element 4 is slowly constricted, as shown in FIG. 3(c), and then suddenly stopped when it returns to its original length, as depicted in FIG. 3(d), the inertial member 3 subjects the moving member 2 to an impact. As a result, the moving member 2 is moved to the left, as shown in FIG. 3(e). In a case where the moving member 2 is moved in the rightward (−) direction, as illustrated in FIG. 4, first the piezoelectric/electrostrictive element 4, which is in the elongated state shown in FIG. 4(a), is suddenly constricted, as shown in FIG. 4(b). When this is done, the moving member 2 and inertial member 3 move toward each other. Next, as depicted in FIG. 4(c), when the piezoelectric/electrostrictive element 4 is slowly constricted, as shown in FIG. 4(c), and then suddenly stopped when it returns to its original length, as depicted in FIG. 4(d), the moving member 2 is moved to the right, as shown in FIG. 4(e).

Though a driven body can be moved (or rotated) in accordance with this prior art, considerable ingenuity is needed to utilize this art in a field of application that requires the microdrive control typical of micromanipulators.

In conventional micromanipulators which perform very fine operations, means relying upon hydraulic pressure, electromagnetic force or mechanical drive are utilized as work drive mechanisms for moving a fine glass needle relative to a cell and as positioning mechanisms for positioning a miniature instrument relative to an object to be manipulated. In the prior art, therefore, the work drive mechanisms and positioning mechanisms of these micromanipulators are large in size.

Furthermore, the comparatively coarse operation of the work drive mechanism of the micromanipulator, the fine operation of the miniature instrument for manipulation, and the operation of the positioning device for positioning between the object and the miniature instrument are controlled individually and by using separate drive systems. For this reason, the apparatus is not only large in size but complicated in structure as well.

In addition, these operations are in part dependent upon control by human intervention and therefore require a skilled operator for control.

SUMMARY OF THE INVENTION

The present invention has been devised in order to solve the foregoing problems and a first object thereof is to provide a microdrive apparatus for highly precise control of a movement through a compact and simple structure.

A second object of the present invention is to provide a microdrive apparatus with which the position, direction and angle of an object or instrument can be freely micro-controlled.

In order to attain the foregoing objects, the present invention provides a miniature instrument for manipulation attached to a moving member movably supported by a support member fixed to the main body of a micromanipulator, in which a micro-driving force generating member comprising a piezoelectric/electrostrictive element and an inertial member fixed to the element are attached to the moving member. By applying an electric field to the piezoelectric/electrostrictive element to move the same, the moving member is driven to perform a manipulation.

The moving member is supported on the support member attached to the distal end of a positioning mechanism for achieving positioning between a manipulated object and a miniature instrument for manipulation, and positioning is achieved between the manipulated object and the miniature instrument for manipulation by an operation similar to that described above.

The moving member can be turned freely through 360° by friction and is supported on the support member attached to an arm capable of rotating 360° about its axis. By controlling the motion of the micro-driving force generating member, its position, direction and angle can be changed at will.

BRIEF DESCRIPTION OF THE DRAWINGS

FIGS. 3(a)~(e) and FIGS. 4(a)~(e) are views for describing the principle of movement of the conventional apparatus for effecting fine movement;

DESCRIPTION OF THE PREFERRED EMBODIMENTS

Embodiments of the present invention will now be described in detail with reference to the drawings.

Figure 5:
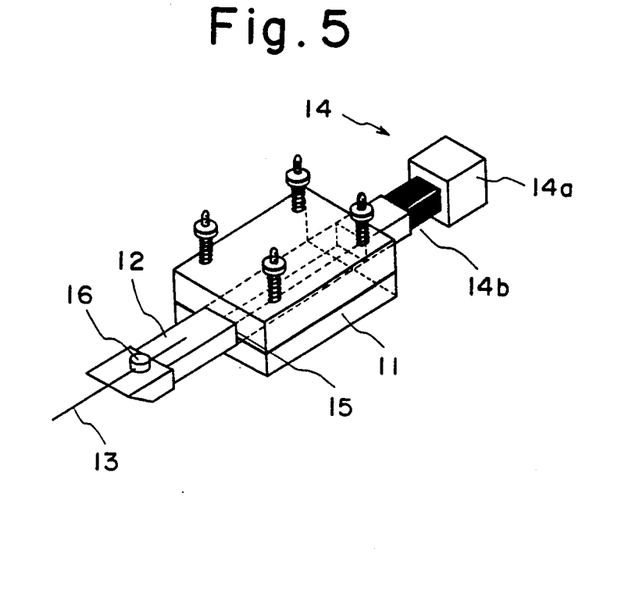
FIG. 5 is a perspective view of a micromanipulator illustrating a first embodiment of the present invention.

As shown in FIG. 5, a micromanipulator according to a first embodiment of the present invention includes a support member 11 formed to have a through-hole in which a moving member 12 is movably supported via a frictional surface 15. The moving member 12 has a distal end portion to which a miniature instrument 13 for manipulation is freely detachably mounted by a fixture 16. A micro-driving force generating member 14 is provided on a rear end portion of the moving member 12. More specifically, an inertial member 14a is coupled to the rear end portion of the moving member 12 via a piezoelectric/electrostrictive element 14b. The frictional surface 15 is metal, ceramic, resin, rubber or the like. An electric field is applied to the piezoelectric-/electrostrictive element 14b of the microdriving force generating member 14 to move the same, whereby the moving member 12 is subjected to microdrive action by utilizing this kinetic energy, the inertial action of the inertial member 14a, and the reaction force acting upon the moving member 12. As a result, an object is treated by the miniature instrument 13 secured to and manipulated by the moving member 12.

The amount of movement of the moving member 12 is controlled by changing the value of the voltage applied to the piezoelectric/electrostrictive element 14b, whereby both a comparatively coarse operation which is the purpose of movement and a fine operation which is the purpose of manipulation can be achieved by the single micro-driving force generating member 14. In this way the structure of the conventional micromanipulator can be simplified and made more compact.

A second embodiment of the present invention will now be described with reference to FIGS. 6~8.

Figure 6:
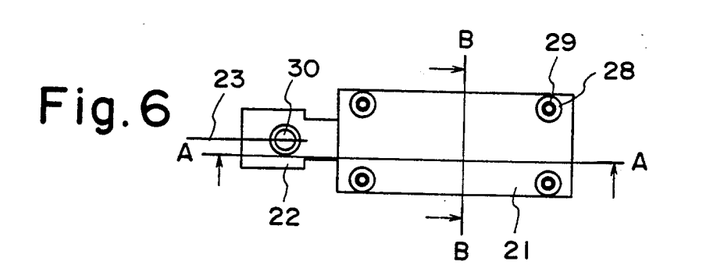
FIG. 6 is a plan view of a micromanipulator illustrating a second embodiment of the present invention.
Figure 7:
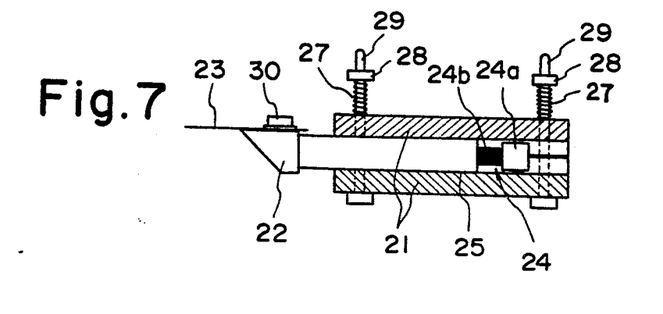
FIG. 7 is a sectional view taken along line A—A of FIG. 6.
Figure 8:
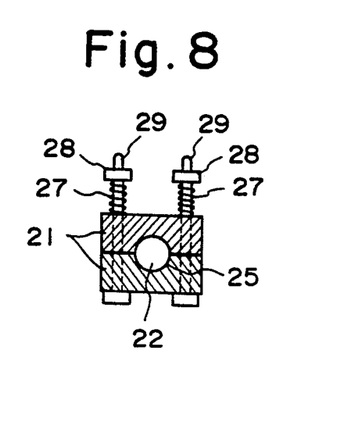
FIG. 8 is a sectional view taken along line B—B of FIG. 6.

As shown in FIGS. 6~8, a support member comprises two parallel plates, 21. The two plates 21 are resiliently biased together by four bolts 29 each equipped with a coil spring 27 held fixed at one end by a set-screw 28. Each plate is provided with a semicylindrical groove 25, whereby a cylindrically shaped through-hole is formed between the assembled plate members 21, and a cylindrical moving member 22 is accommodated within the through-hole which provides a frictional support surface for the moving member 22. The moving member 22 has a distal end portion to which a miniature instrument 23 to be manipulated is detachably mounted by a clamp 30. The moving member 22 also has a rear end portion provided with a micro-driving force generating member 24. That is, an inertial member 24a is coupled to the rear end portion of the moving member 22 via a piezoelectric/electrostrictive element 24b.

In this embodiment, the characterizing features are that the length of the contact portion between the moving member 22 and frictional surface 25 is smaller than the length of the support member 21 and the micro-driving force generating member 24 is accommodated within the support member 21, and that the support member 21 is divided into upper and lower halves, with the upper-half portion being provided with the springs 27 and a capability for adjusting the frictional force.

Figure 9:
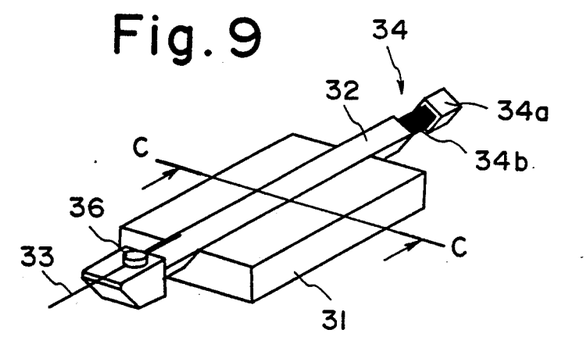
FIG. 9 is a perspective view of a micromanipulator illustrating a third embodiment of the present invention.
Figure 10:
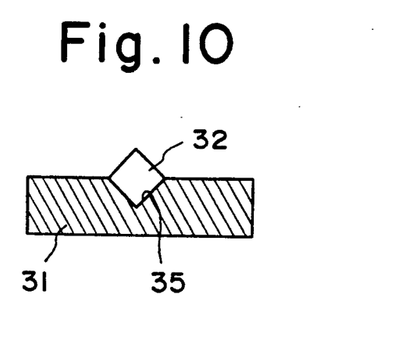
FIG. 10 is a sectional view taken along line C—C of FIG. 9.

A third embodiment of the present invention will now be described with reference to FIGS. 9 and 10.

In accordance with this embodiment, a support member 31 comprises a permanent magnet the upper surface of which is provided with a frictional surface in the form of a triangular groove 35. A moving member 42 includes a magnetic body having a rectangular cross section is received in the triangular groove 35. More specifically, the moving member 32 is held in intimate contact with the frictional surface 35 by magnetic force and is thereby supported on the support member 31. The moving member 32 has a distal end portion to which a miniature instrument 33 to be manipulated is detachably mounted by a clamp 36. The moving member 32 also has a rear end portion provided with a micro-driving force generating member 34. That is, an inertial member 34a is coupled to the rear end portion of the moving member 32 via a piezoelectric/electrostrictive element 34b. As a result of the driving force provided by the piezoelectric/electrostrictive element 34b, the moving member 32 is made to move by overcoming the frictional force of the frictional surface 35 produced by the magnetic force.

This embodiment makes it possible to provide a highly simplified support for a moving member.

It is also possible to adopt an arrangement in which both the moving member 32 and support member 31 are permanent magnets and attract each other.

Figure 11:
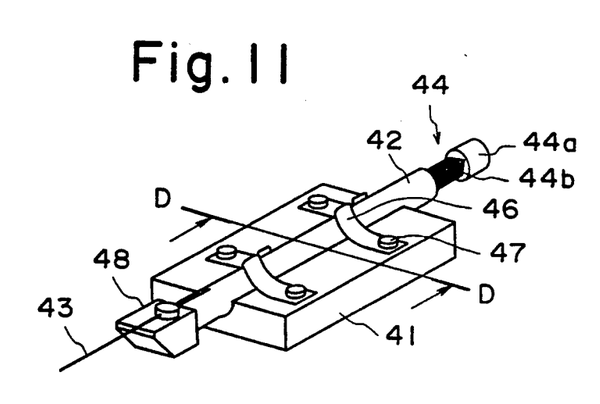
FIG. 11 is a perspective view of a micromanipulator illustrating a fourth embodiment of the present invention.
Figure 12:
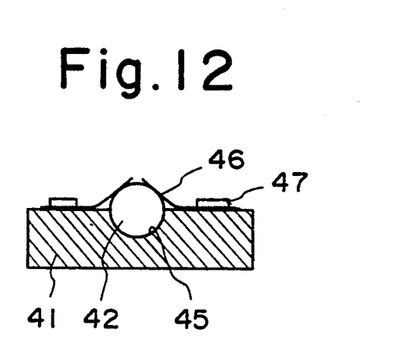
FIG. 12 is a sectional view taken along line D—D of FIG. 11.

A fourth embodiment of the present invention will be described with reference to FIGS. 11 and 12.

In this embodiment, the upper surface of a support member 41 is provided with a frictional support in the form of surface a groove 45 in the shape of a semicircular cylinder. A moving member 42 having a circular cross section is mounted in groove 45. The moving member 42 is forcibly engaged by the free ends of leaf springs 46 whose base portions are fastened at opposite sides of the upper surface of the support member 41 by fasteners 47. The moving member 42 is thus resiliently supported on the support member 41. The moving member 42 has a distal end portion to which a miniature instrument 43 to be manipulated is detachably mounted by a fixture 48. The moving member 42 also has a rear end portion provided with a micro-driving force generating member 44. That is, an inertial member 44a is coupled to the rear end portion of the moving member 42 via a piezoelectric/electrostrictive element 44b. The frictional force can be adjusted by changing the number of leaf springs 46 and the elastic force of the leaf springs 46 proper. By suitably setting the elastic force of the leaf springs 46, an accurate frictional force can be obtained.

This embodiment also makes it possible to provide highly simplified support means for a moving member.

Figure 13:
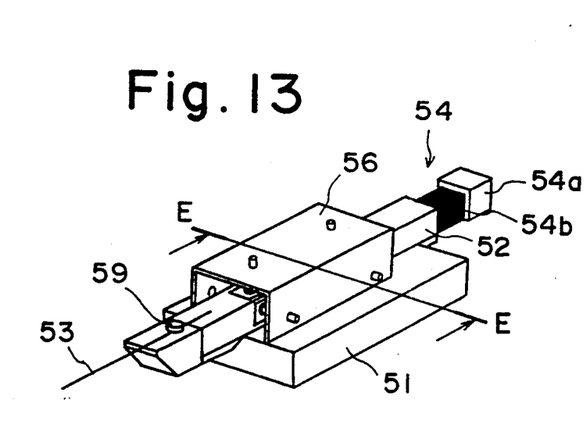
FIG. 13 is a perspective view of a micromanipulator illustrating a fifth embodiment of the present invention.
Figure 14:
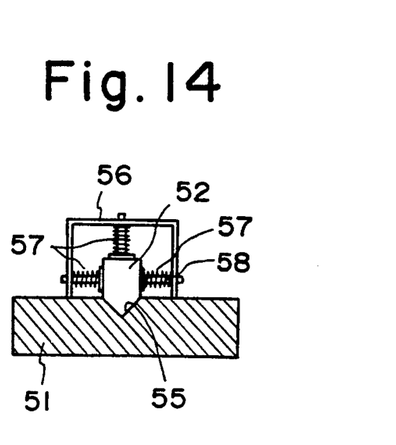
FIG. 14 is a sectional view taken along line E—E of FIG. 13.

A fifth embodiment of the present invention will be described with reference to FIGS. 13 and 14.

In this embodiment, the upper surface of a support member 51 is provided with a frictional surface 55 having a groove in the shape of a triangle. A moving member 52 whose lower surface is formed to have a projection with a triangular cross section so as to correspond to the frictional surface 55 is placed thereon. A frame 56 is constructed on the upper surface of the support member 51, and the frame 56 supports push-rods 58. The push-rods 58 are thrust against the three faces of the moving member 52 by the force of coil springs 57 wound thereon, whereby the moving member 52 is supported. The moving member 52 has a distal end portion to which a miniature instrument 53 for manipulation is detachably mounted by a fixture 59. The moving member 52 also has a rear end portion provided with a micro-driving force generating member 54. That is, an inertial member 54a is coupled to the rear end portion of the moving member 52 via a piezoelectric/electrostrictive element 54b. The frictional force can be adjusted in dependence upon the number of coil springs 57 or by changing the elastic force of the coil springs 57 proper.

Thus, in third through fifth embodiments described above, a moving member support mechanism is constructed using an open-type support member.

A sixth embodiment of the present invention will now be described with reference to FIGS. 15 and 16.

Figure 15:
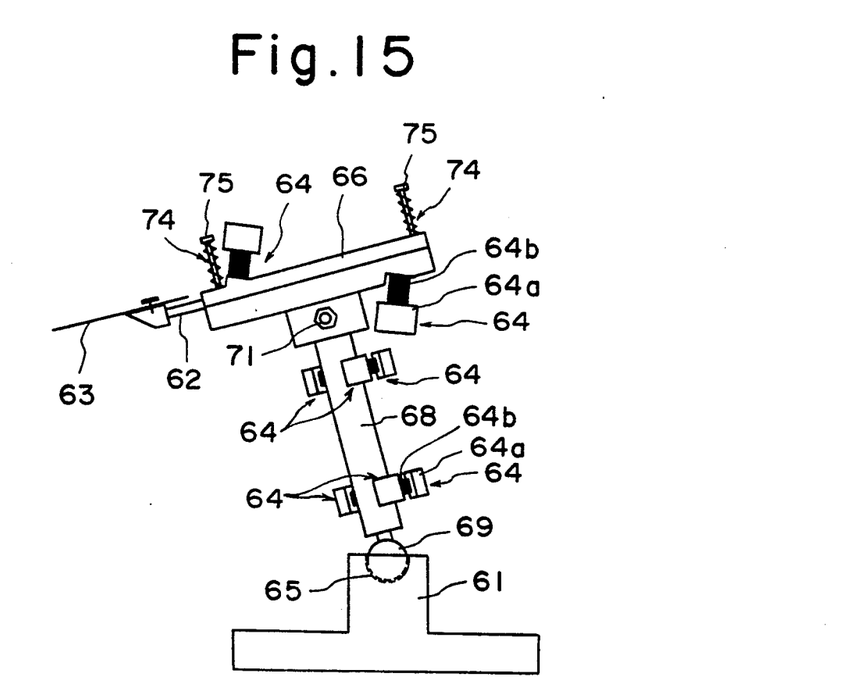
FIG. 15 is a side view of a micromanipulator illustrating a sixth embodiment of the present invention.
Figure 16:
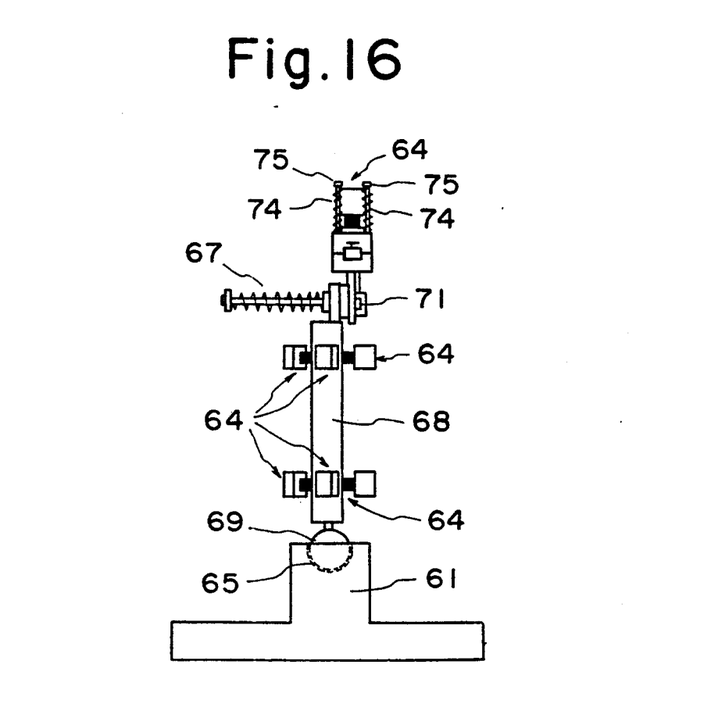
FIG. 16 is a front view of the micromanipulator illustrating the sixth embodiment of the present invention.

As shown in FIGS. 15 and 16, a rotational arm 66 supporting a moving member 62 is connected to an articulated arm 68 having multiple degrees of freedom. The rotational arm 66 undergoes rotational motion about a rotary shaft 71 held by a frictional force determined by the resilient force of the coil spring 67. The articulated arm 68 having multiple degrees of freedom has a spherical body 69 provided at its lower end. The spherical body 69 is in intimate contact with a base 61 via a frictional surface 65 and is retained by the frictional force thereof. As shown in FIGS. 6 through 8, the rotational arm 66 comprises two plates, one above the other, the plates are resiliently assembled together by coil springs wound around bolts 75 and fixedly secured at one end, and a cylindrically shaped moving member 62 is accommodated in the central portion between the plates. Further, as shown in FIGS. 7 and 8, the rear end portion of the moving member 62 is provided with a micro-driving force generating member comprising a piezoelectric/electrostrictive element and an inertial member coupled to the rear end portion via the piezoelectric/electrostrictive element. These components are accommodated within the support member.

A micro-driving force generating member 64 is provided on the rotational arm 66 and on the articulated arm 68 having the multiple degrees of freedom. The micro-driving force generating member 64 attached to the articulated arm 68 is disposed at a position off-center with respect to the central axis of the arm 68.

By applying an electric field to an piezoelectric/electrostrictive element 64b of the micro-driving force generating member 64 to produce movement, the rotational arm 66 and the articulated arm 68 having the multiple degrees of freedom undergo microdrive by utilizing this kinetic energy, the inertial action of the inertial member 64a, and the reaction force or frictional force acting upon the moving member 62. As a result, an object is treated by manipulation of the miniature instrument 63 secured to the moving member 62. This makes it possible to control the positioning operation between an object and a miniature instrument 63. Conventional means such as a micropipette, microneedle or microscissors can be used as the miniature instrument 63.

Thus, the micromanipulator of the present invention is smaller and simpler than that of the prior art and can be utilized effectively in the field of biotechnology for such purposes as injecting minute amounts of a material into a cell, removing a nucleus from a cell or inserting a nucleus into a cell by using a miniature instrument.

Furthermore, the positioning mechanism of the present invention can be utilized as the drive mechanism of a precision positioning device such as a working hand.

As described in detail above, the present invention provides the following advantages:

(1) A micro-driving force generating member utilizing impact impact force is attached to a working drive muchanism. As a result, the comparatively coarse operation of the working drive mechanism and the fine operation of a miniature instrument for manipulation can be controlled by a single drive mechanism.

Accordingly, the structure of the working drive mechanism can be reduced in size and simplified, and the operability thereof is thereby improved. Furthermore, the manufacturing cost of the apparatus is reduced and reliability enhanced.

(2) A micro-driving force generating member utilizing impact force is attached to a working drive mechanism and a positioning device for achieving positioning between a manipulated object and a miniature instrument. As a result, control of micromanipulator operation can be performed entirely by controlling the voltage applied to the piezoelectric/electrostrictive element.

Accordingly, the structure of the micromanipulator can be reduced in size and simplified. Furthermore, the manufacturing cost of the micromanipulator is reduced and reliability enhanced.

(3) Control based on the order of nanometers is made possible by drive control and positioning control performed by a micro-driving force generating member utilizing an impact force. Since this provides more degrees of freedom in terms of working conditions than is possible in the prior art and eliminates portions dependent upon control by human intervention, as is required in the prior art, the apparatus is capable of being simply controlled without requiring a highly skilled operator.

(4) Since the structure of the drive mechanism is simplified, members such as a rotational arm or pipette can be freely combined, and changes in design are possible.

An articulated device utilizing the micromanipulator in accordance with the present invention will now be described with reference to FIGS. 17 through 19.

Figure 17:
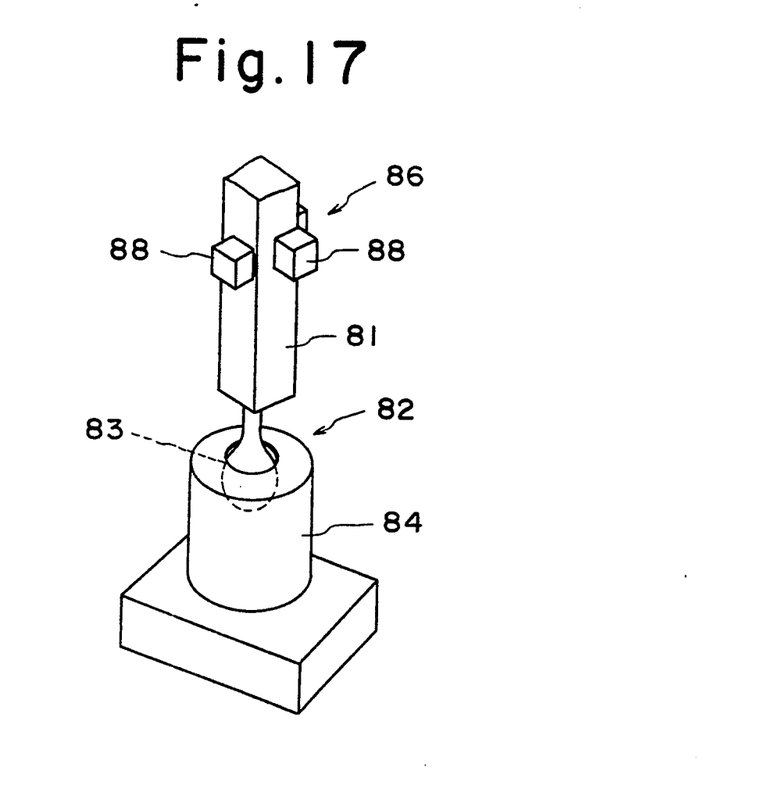
FIG. 17 is a perspective view of an articulated device of the micromanipulator illustrating the first embodiment of the present invention.
Figure 18A:
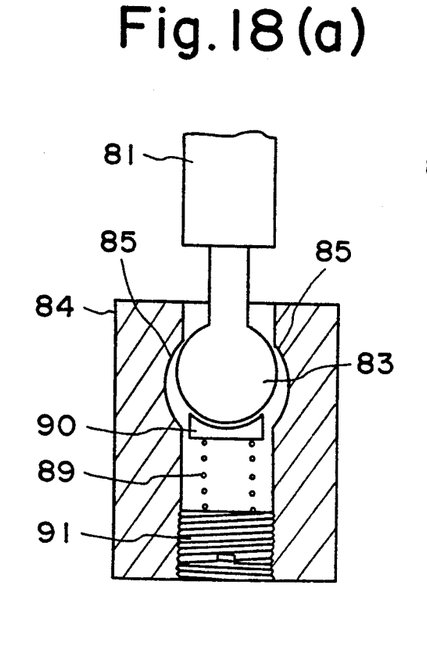
FIG. 18(a) is a sectional view of an articulated portion illustrating a first embodiment of the articulated device shown in FIG. 17.
Figure 18B:
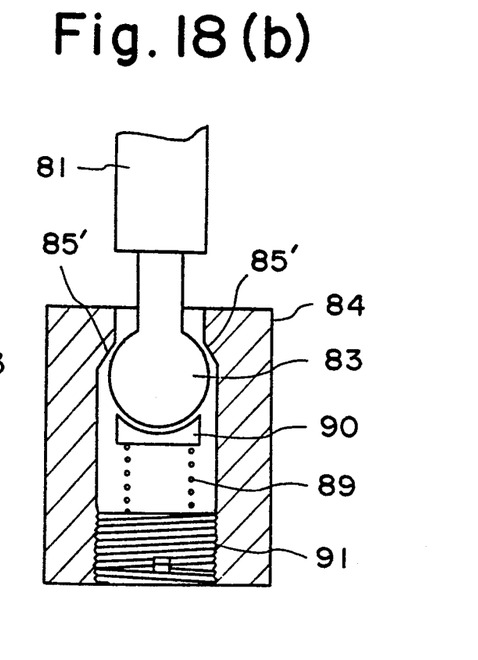
FIG. 18(b) is a sectional view of an articulated portion illustrating a second embodiment of the articulated device shown in FIG. 17.
Figure 19:
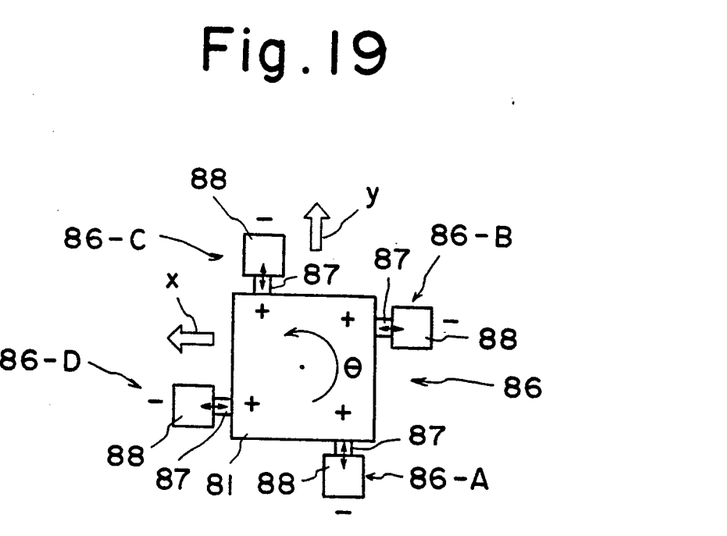
FIG. 19 is a plan view of micro-driving force generating members attached to an arm of the articulated device as shown in FIG. 17.

As shown in FIGS. 17 through 19, an arm 81 has a rectangular cross section and includes an articulated portion 82. As shown in FIG. 18(a), the latter comprises a spherical body 83, and a support member 84 having a concave surface 85 which receives the spherical body 83. A spring 89 which applies a frictional force to the spherical body 83 is provided within the articulated portion 82 and urges the spherical body 83 upward via a spring seat 90. The elastic force of the spring 89 can be freely adjusted by a screw 91. Accordingly, the frictional force between the spherical body 83 and the concave surface 85 is capable of being freely adjusted. It is possible to adopt an arrangement in which electromagnetic force or electrostatic force is utilized to control the frictional force.

The structure of the articulated portion 82 is not particularly limited. As shown in FIG. 18(b), a conical surface 85' can be utilized instead of the concave surface 85 as the frictional support surface. In other words, the structure of the articulated portion 82 may be such that its frictional surface extends 360° the moving member.

Further, a micro-driving force generating member 86 comprising a piezoelectric/electrostrictive element 87 (see FIG. 19) and an inertial member 88 is attached horizontally to the arm 81. As shown in FIG. 19, the micro-driving force generating member 86 is attached to each of the four side faces of the arm 81 and is arranged at a position off-center with respect to the central axis of the arm 81.

The operation of the articulated device will now be described with reference to FIG. 19.

First, when motion in the + direction (see FIG. 3) is applied to a micro-driving force generating member 86-A and the same amount of motion in the − direction (see FIG. 4) is applied to a micro-driving force generating member 86-C, the arm 81 develops a driving force in the direction of the arrow y, as a result of which the arm 81 is tilted in the y direction. When motion in the + direction is applied to a micro-driving force generating member 86-B and the same amount of motion in the − direction is applied to a micro-driving force generating member 86-D, the arm 81 develops a driving force in the direction of the arrow x, as a result of which the arm 81 is tilted in the x direction.

Next, when motion in the + direction is applied to each of the micro-driving force generating members 86-A, 86-C, the arm 81 is subjected to torque in the direction of the arrow $\theta$, as a result of which the arm 81 rotates in the $\theta$ direction. Further, if motion in the + direction is applied to each of the micro-driving force generating members 86-B, 86-D, the same rotational motion will occur.

The foregoing is the fundamental operation. The arm can be controlled for movement in any direction or through any angle by suitably selecting the positions at which the micro-driving force generating members are attached, the driving forces thereof, the directions in which these forces are applied and the voltages applied to the piezoelectric/electrostrictive elements, and by suitably controlling the applied voltage patterns and the resultant forces.

In addition, the amount of arm movement can be controlled on the order of micrometers to nanometers by changing the voltage pattern or voltage pulse rate of the voltage applied to the piezoelectric/electrostrictive elements.

Figure 20:
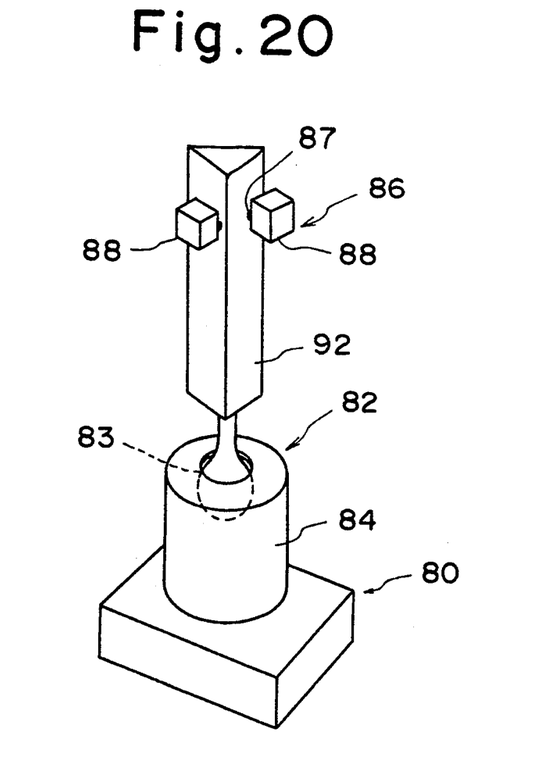
FIG. 20 is a perspective view of an articulated device of the micromanipulator illustrating the second embodiment of the present invention.
Figure 21:
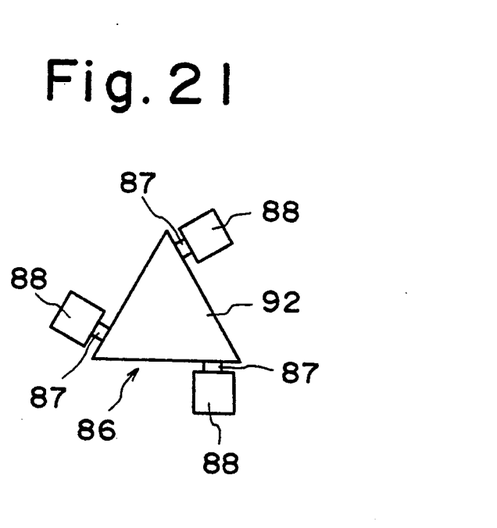
FIG. 21 is a plan view illustrating an example of the arrangement of micro-driving force generators attached to an arm of the articulated device of FIG. 20.

Instead of the arm 81 having the rectangular shape of the above-described embodiment, an arm 92 having the regular triangular cross section can be used, as shown in FIGS. 20 and 21, with a micro-driving force generating member 86 being attached to each of the three side faces of the arm 92. In this case also the micro-driving force generating members 86 are arranged at positions off-center with respect to the central axis of the arm 92.

Figure 22:
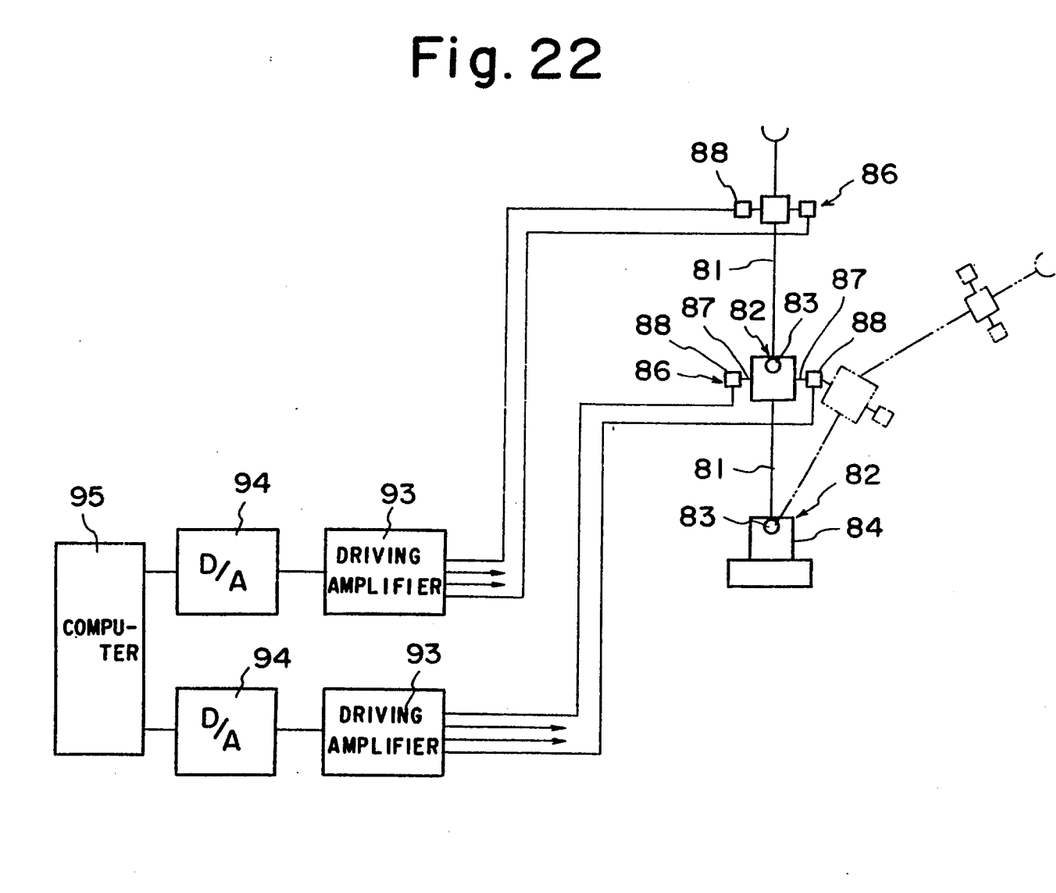
FIG. 22 is a view schematically showing the arrangement of a multiple-articulated device of a micromanipulator according to the present invention.
Figure 23:
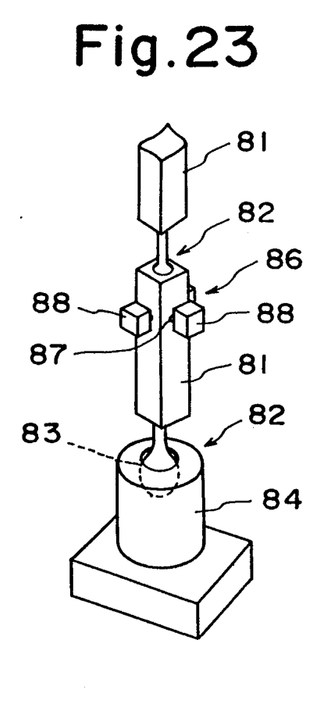
FIG. 23 is a partial perspective view of the multiple-articulated device shown in FIG. 22.

As illustrated in FIGS. 22 and 23, the above-described articulated device can be constructed as a multiple-articulated device extended to two stages.

Here the arm 81 is supported so as to be capable of tilting and swiveling freely at the articulated joint 82, and the free end of the arm 81 has a plurality of the micro-driving force generating members 86 attached thereto. As a result, fine articulated motion of the arm 81 can be realized about the articulated joint 82. More specifically, the micro-driving force generating member 86 is attached to each of the four sides of the arm 81, and voltage in accordance with a preset sequence is supplied from driving amplifiers 93 to the piezoelectric/electrostrictive elements 87 to drive the same, whereby the arms 81 are subjected to microcontrol. Control signals outputted by a computer 95 enter the driving amplifiers 93 via D/A converters 94.

As a result, a large variety of articulated operations can be realized quickly and accurately in a micromanipulator or the like, and operating efficiency can be improved.

The invention can be applied to control the attitude of a specimen base in a microscope. In addition, in a case where the orientation of an optic axis is to be changed by a prism or mirror, the latter can be attached to an arm to enable highly precise control of the prism or mirror.

Furthermore, since an arm can be driven merely by attaching a micro-driving force generating member utilizing a piezoelectric/electrostrictive element to the arm, the overall size of the apparatus can be reduced. In other words, the present invention is particularly effective in the fields of electronic instrumentation, biotechnology and optical equipment, which require greater miniaturization.

The present invention is not limited to the foregoing embodiments but can be modified in various ways based on the gist thereof without departing from the scope of the claims.

What we claim is:

1. A micromanipulator for microbiological applications involving manipulation within a cell comprising:
   (a) a fixed support member having a channel defining a linear path traversing one dimension of said support member;
   (b) a movable member slidably mounted in said linear path for sliding movement in frictional contact with said support member;

(c) at least one elongated electrostrictive/piezoelectric element fixed at one end to said movable member and extending from said movable member along a longitudinal axis parallel to said linear path;

(d) an inertial body fixed to the end of said electrostrictive/piezoelectric element opposite said movable member, said inertial body being suspended by said electrostrictive/piezoelectric element free of contact with said support member;

(e) a miniature instrument for micromanipulation fixed to said movable member;

(f) spring means for increasing the frictional force between said movable member and said support surface and for adjusting the increased frictional force;

(g) means for reversibly micro-driving said miniature instrument by applying a voltage to said one electrostrictive/piezoelectric element; and (h) means for varying said applied voltage to provide both coarse movement for positioning and fine movement for cell manipulation.

2. A micromanipulator in accordance with claim 1 wherein said means defining a linear path is a through-hole extending through said support member.

3. A micromanipulator in accordance with claim 1 wherein said means defining a linear path is a channel formed across a surface of said support member, said channel having a shape which, in cross-section, mates with a portion of said movable member.

4. A micromanipulator in accordance with claim 3 comprising two of said support member secured together with said channels in a facing relationship, whereby said channels together form a through-hole extending between the secured support members.

5. A micromanipulator in accordance with claim 1 further comprising an arm supported at one end for tilting movement in any direction, said support member being mounted on said arm and positioned on said arm for micro-driving said arm to tilt in a given direction.

6. A micromanipulator in accordance with claim 1 further comprising an arm supported for rotation about its axis, said support member being mounted off-center on said arm with the axis of said arm being perpendicular to the longitudinal axis of said electrostrictive element, whereby said arm is micro-driven for rotation.

7. A micromanipulator in accordance with claim 1 wherein said movable member is moved along said path by reaction forces generated by expansion or contraction of said electrostrictive element and acting against frictional forces between said support member and said movable member.

8. A micromanipulator in accordance with claim 1 wherein said miniature instrument is a microneedle for injecting material into a cell, removing a nucleus from a cell or inserting a nucleus into a cell.

* * * * *

UNITED STATES PATENT AND TRADEMARK OFFICE
CERTIFICATE OF CORRECTION

PATENT NO. : 5,229,679                          PAGE 1 of 2

DATED : July 20, 1993

INVENTOR(S) : HIGUCHI et al

It is certified that error appears in the above-identified patent and that said Letters Patent is hereby corrected as shown below:

Col. 5, line 24, after "and" insert --by changing--;

line 26, delete "an accurate";

line 28, delete "means";

line 32, delete "55 hav-";

line 33, delete "ing" insert --in the form of-- and after "groove" insert --55--;

line 34, after "52" insert a comma --,--;

line 36, delete "frictional surface" insert --groove-- and after "55" insert a comma --,--;

line 37, delete "constructed" insert --mounted--;

line 39, delete "thrust" insert --pressed--; delete "the", first instance, and delete "faces" insert --surfaces--;

line 43, delete "for manipu-";

UNITED STATES PATENT AND TRADEMARK OFFICE
CERTIFICATE OF CORRECTION

PATENT NO. : 5,229,679
DATED : July 20, 1993
INVENTOR(S) : HIGUCHI et al

It is certified that error appears in the above-identified patent and that said Letters Patent is hereby corrected as shown below:

line 44, delete "lation" insert --to be manipulated-- and delete "fixture" insert --clamp--;

line 50, delete "in dependence upon" insert --by changing--.

Col. 6, line 45, delete "impact", second instance;

line 46, delete "muchanism" insert --mechanism--.

Col. 7, line 35, before "the" insert --around--.

Col. 10, line 4, delete "member" insert --members--;

Signed and Sealed this

Nineteenth Day of April, 1994

Attest:

BRUCE LEHMAN

Attesting Officer     Commissioner of Patents and Trademarks